US012729638B2

(12) United States Patent
Hammer

(10) Patent No.: US 12,729,638 B2
(45) Date of Patent: Sep. 8, 2026

(54) EXHAUST GAS HEATER

(71) Applicant: Purem GmbH, Neunkirchen (DE)

(72) Inventor: Jochen Hammer, Stuttgart (DE)

(73) Assignee: Purem GmbH, Neunkirchen (DE)

( * ) Notice: Subject to any disclaimer, the term of this patent is extended or adjusted under 35 U.S.C. 154(b) by 964 days.

(21) Appl. No.: 17/822,491

(22) Filed: Aug. 26, 2022

(65) Prior Publication Data

US 2023/0060816 A1 Mar. 2, 2023

(30) Foreign Application Priority Data

Aug. 26, 2021 (DE) ..................... 10 2021 122 086.6

(51) Int. Cl.
*F01N 3/20* (2006.01)
*H05B 3/06* (2006.01)

(52) U.S. Cl.
CPC ............. *F01N 3/2026* (2013.01); *H05B 3/06* (2013.01); *H05B 2203/016* (2013.01); *H05B 2203/022* (2013.01)

(58) Field of Classification Search
CPC .. F01N 3/2026; F01N 2240/04; F01N 3/2013; F01N 3/027; F01N 3/28; F01N 2240/16; H05B 3/06; H05B 2203/016; H05B 2203/022; H05B 3/10; Y02T 10/12
See application file for complete search history.

(56) References Cited

U.S. PATENT DOCUMENTS 5,562,885 A 10/1996 Bayer et al.
2014/0190151 A1 7/2014 Culbertson et al.
2021/0156289 A1 5/2021 Kurpejovic et al.
2021/0332730 A1 10/2021 Kurpejovic et al.
2022/0174787 A1 6/2022 Mallon et al.
2022/0186647 A1 6/2022 Saurat et al.

FOREIGN PATENT DOCUMENTS

CN 110206619 A 9/2019
CN 112343696 A 2/2021
DE 10 2019 121 382 A1 2/2021
DE 20 2021 102 620 U1 7/2021
DE 10 2020 131 726 A1 6/2022

(Continued)

OTHER PUBLICATIONS

English translation of Chinese Office action of the Chinese Patent Office dated Sep. 26, 2025 in corresponding Chinese patent application No. 202211022497.8.

(Continued)

*Primary Examiner* — Robert G Bachner
(74) *Attorney, Agent, or Firm* — Walter Ottesen, P.A.

(57) ABSTRACT

An exhaust gas heater for an exhaust gas system of an internal combustion engine includes a carrier arrangement and a heating conductor arrangement carried on the carrier arrangement. The heating conductor arrangement has at least one heating conductor. At least one carrier-arrangement supporting unit is provided for carrying the heating conductor in an electrically insulated manner with respect to the carrier arrangement. The carrier-arrangement supporting unit includes at least one of the following: an insulating coating applied to the carrier arrangement; and, an insulating coating applied to the heating conductor supported on the carrier arrangement via the carrier-arrangement supporting unit.

15 Claims, 2 Drawing Sheets

(56) References Cited

FOREIGN PATENT DOCUMENTS

| | | | |
|---|---|---|---|
| DE | 10 2021 109 568 | A1 | 9/2022 |
| EP | 3 825 528 | A1 | 5/2021 |
| EP | 3 901 433 | A1 | 10/2021 |
| JP | S62-75011 | A | 4/1987 |
| JP | 4-164115 | A | 6/1992 |
| JP | H4-164115 | A | 6/1992 |
| JP | 2016-503854 | A | 2/2016 |
| WO | 2014/100118 | A1 | 6/2014 |

OTHER PUBLICATIONS

English translation of the Second Chinese Office action of the Chinese Patent Office dated Apr. 9, 2026 in corresponding Chinese patent application No. 202211022497.8.

EXHAUST GAS HEATER

CROSS REFERENCE TO RELATED APPLICATION

This application claims priority of German patent application no. 10 2021 122 086.6, filed Aug. 26, 2021, the entire content of which is incorporated herein by reference.

TECHNICAL FIELD

The present disclosure relates to an exhaust gas heater with which heat in an exhaust gas system of a motor vehicle can be transmitted to the exhaust gas flowing therein that has been discharged from an internal combustion engine, in order thereby to bring areas of the system that are arranged upstream of the exhaust gas heater, such as for example catalytic converters or particle filters, more quickly to operating temperature, in particular in a starting phase of the operation of an internal combustion engine.

BACKGROUND

The subsequently published German patent application DE 10 2021 109 568 discloses an exhaust gas heater in which, between two substantially plate-like carrier elements of a carrier arrangement that are constructed from a sheet-metal material, two heating conductors of a heating-conductor arrangement that have been provided by cutting out from a flat material and are of a substantially plate-like or two-dimensional form are arranged following one another in a main direction of exhaust gas flow corresponding to a longitudinal direction of the exhaust gas heater. The layered configuration including carrier elements and heating conductors arranged between them is held together by a connecting arrangement including a plurality of connecting elements of a bolt-like form. In order to achieve electrical insulation of the heating conductors with respect to the carrier elements or else with respect to one another, a number of supporting units of electrically insulating material, for example ceramic material, are respectively arranged between them.

SUMMARY

An object of the present disclosure is to provide an exhaust gas heater in which the supporting of one or more heating conductors on a carrier arrangement or on another heating conductor is realized in a permanently stable manner even at high operating temperatures.

According to the disclosure, an exhaust gas heater is provided for an exhaust gas system of an internal combustion engine. The exhaust gas heater includes:

- a carrier arrangement,
- a heating-conductor arrangement, carried on the carrier arrangement and having at least one heating conductor through which a current flows, with at least one heating conductor being carried in an electrically insulated manner with respect to the carrier arrangement by at least one carrier-arrangement supporting unit and/or with at least one heating conductor being carried in an electrically insulated manner with respect to a further heating conductor by a heating-conductor supporting unit, with at least one carrier-arrangement supporting unit including an insulating coating applied to the carrier arrangement and/or an insulating coating applied to the heating conductor supported on the carrier arrangement by way of this carrier-arrangement supporting unit, and/or with at least one heating-conductor supporting unit including an insulating coating applied to one of the heating conductors supported with respect to one another by this heating-conductor supporting unit and/or an insulating coating applied to the other of the heating conductors supported with respect to one another by this heating-conductor supporting unit.

In the case of an exhaust gas heater constructed according to the disclosure, a respective insulating coating is only securely bonded to that component of two components that are to be supported in an electrically insulating manner with respect to one another to which the insulating coating has been applied.

It is not securely bonded with respect to the other of the components, so that in particular relative movements induced by vibrations or different thermal expansions are made possible between the components to be supported with respect to one another without mechanical stresses occurring.

A secure bond of such an insulating coating with the component receiving it may be realized for example by at least one, preferably each insulating coating having been applied by deposition, for example vapor deposition, or by application in a flowable state.

To provide a mechanically stable, temperature-resistant, but nevertheless electrically well-insulating coating, at least one, preferably each insulating coating may be constructed from an inorganic insulating material, preferably a ceramic material.

For a stable construction of an exhaust gas heater, the carrier arrangement may include two carrier elements, receiving the heating-conductor arrangement between them in the direction of a longitudinal axis of the exhaust gas heater. In this case, at least one, preferably each carrier-arrangement supporting unit may include an insulating coating applied to one of the carrier elements.

As an alternative or in addition, it may be provided that at least one, preferably each carrier-arrangement supporting unit includes an insulating coating applied to a heating conductor of the heating-conductor arrangement.

To obtain a secure, but nevertheless electrically insulated bond of the carrier arrangement to the heating-conductor arrangement, the heating-conductor arrangement may be connected to the carrier arrangement via a plurality of bolt-like connecting elements, with at least one, preferably each connecting element passing through at least one, preferably each heating conductor of the heating-conductor arrangement in the region of a connecting-element opening. In this case, at least one, preferably each connecting element may be surrounded by an insulating element in the region of its length that passes through a connecting-element opening.

The disclosure also relates to an exhaust gas system for an internal combustion engine including at least one exhaust gas heater according to the disclosure.

BRIEF DESCRIPTION OF THE DRAWINGS

The invention will now be described with reference to the drawings wherein.

DESCRIPTION OF THE PREFERRED EMBODIMENTS

Figure 1:
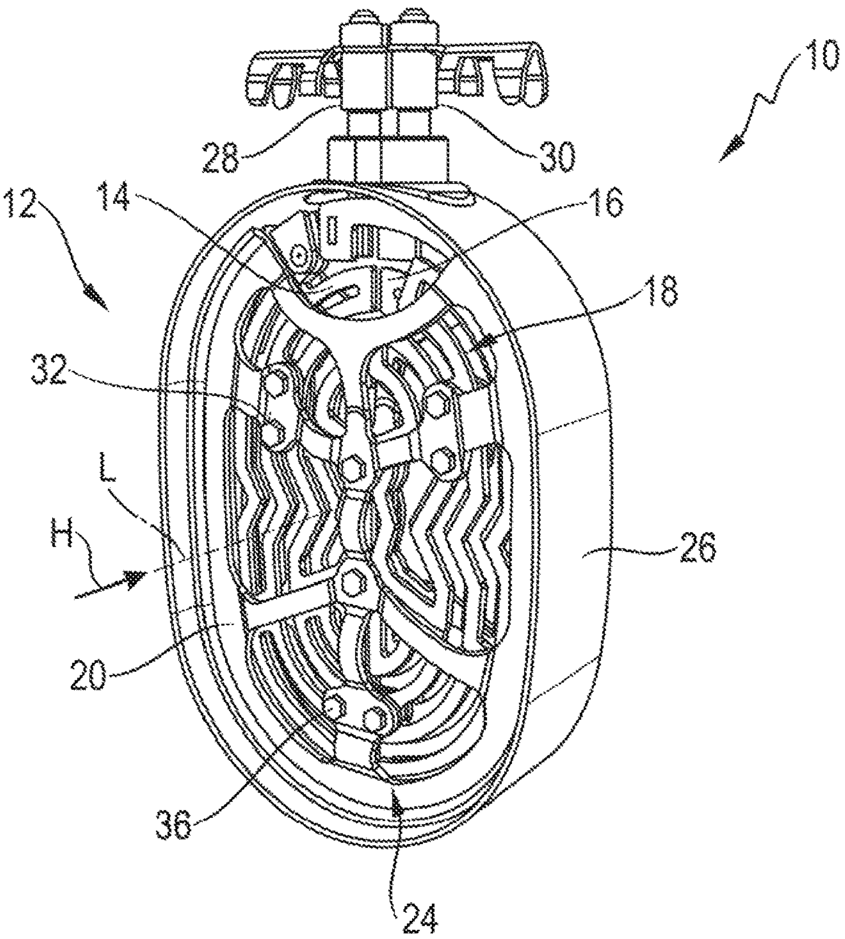
FIG. 1 shows a perspective view of an exhaust gas heater.
Figure 2:
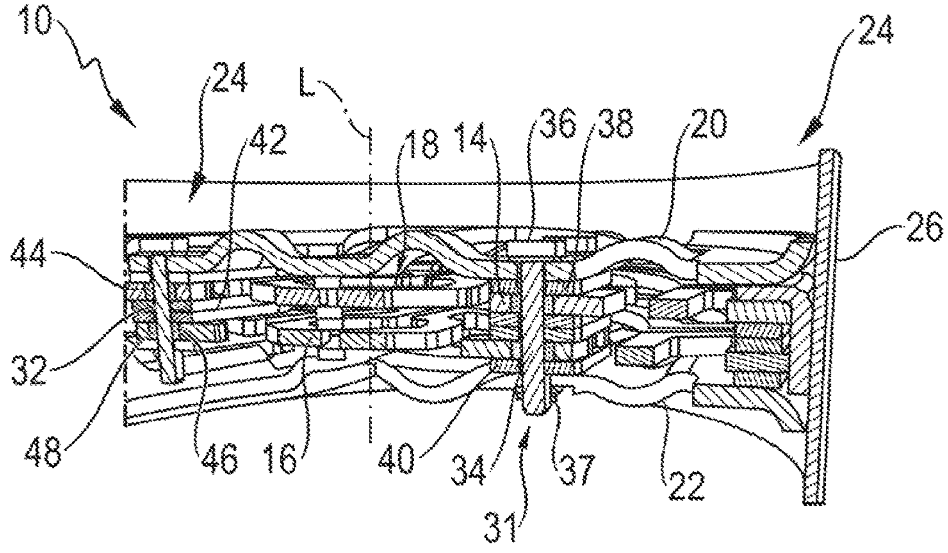
FIG. 2 shows a longitudinal sectional view of the exhaust gas heater from FIG. 1.

Before the inventive way in which a heating-conductor arrangement is mounted in an electrically insulated manner on a carrier arrangement of an exhaust gas heater is described in detail with reference to FIGS. 3 and 4, the basic configuration of such an exhaust gas heater 10 for an exhaust gas system 12 of an internal combustion engine, for example on a motor vehicle, is described with reference to FIGS. 1 and 2.

In the exhaust gas system 12, the exhaust gas heater 10 can be flowed through by exhaust gas in a main direction H of exhaust gas flow and has two heating conductors 14, 16 of a heating-conductor arrangement, denoted generally by 18, which are arranged following one another in the direction of the longitudinal axis L of the exhaust gas heater and consequently can be flowed around one after the other by exhaust gas flowing substantially in the main direction H of exhaust gas flow. The heating conductors 14, 16 are constructed as substantially plate-like or from flat material and can be produced with their structure that is provided with a plurality of portions running in a meandering structure by cutting out from a blank of flat material, in particular a metal blank.

On the sides of the two heating conductors 14, 16 that are lying facing away from one another in the direction of the longitudinal axis L of the exhaust gas heater, carrier elements 20, 22 of a carrier arrangement, denoted generally by 24, that are of a substantially plate-like configuration are provided. On their outer circumferential region, the plate-like carrier elements 20, 22 are fixed on a substantially cylindrical carrier housing 26.

The two heating conductors 14, 16 may be connected in series or parallel to one another. Provided for electrical connection to a voltage source are two connecting units 28, 30, which pass through the carrier housing 26 and are connected in an electrically conducting manner to the heating conductors 14, 16 in the interior space surrounded by the carrier housing 26.

To obtain a stable assembly, the two carrier elements 20, 22 and the heating conductors 14, 16 arranged between them, lying directly adjacent to one another, are securely connected to one another by a plurality of connecting elements 32 of a bolt-like form. The connecting elements 32 may for example be formed as threaded bolts with a shank 34 and a head 36. A nut element 37 may be screwed onto the shank 34, for example, in order to clamp the layered configuration including carrier elements 20, 22 and heating conductors 14, 16 between the head 36 and the nut element 37.

To achieve electrical insulation of the heating conductors 14, 16 with respect to the carrier elements 20, 22 of the carrier arrangement 24, which are generally constructed from a metal material, provided between the heating-conductor element 14 and the carrier element 20, for example in assignment to each connecting element 32, is a carrier-arrangement supporting unit 38, which is constructed from an electrically insulating material, for example a ceramic material, is of a substantially plate-like form and is passed through by the assigned connecting element 32 in the region of an opening provided therein. Also provided, for example in assignment to each connecting element 32, is a carrier-element supporting unit 40, arranged between the heating conductor 16 and the carrier element 22.

In order to support the two heating conductors 14, 16 lying next to one another with respect to one another in an electrically insulating manner, provided for example in assignment to each connecting element 32 is a heating-conductor supporting unit 42. Also each heating-conductor supporting unit 42 is of a substantially plate-like form, including one or more disks, and is constructed from a ceramic material.

Where the heating conductors 14, 16 are passed through by the connecting element 32 in the region of respective connecting-element openings 44, 46, sleeve-like insulating elements 48, for example of a ceramic material, may be inserted in connecting-element openings 44, 46 formed in the heating conductors 14, 16, in order to achieve defined positioning of the connecting element 32 in the openings provided in the heating conductors 14, 16.

Figure 3:
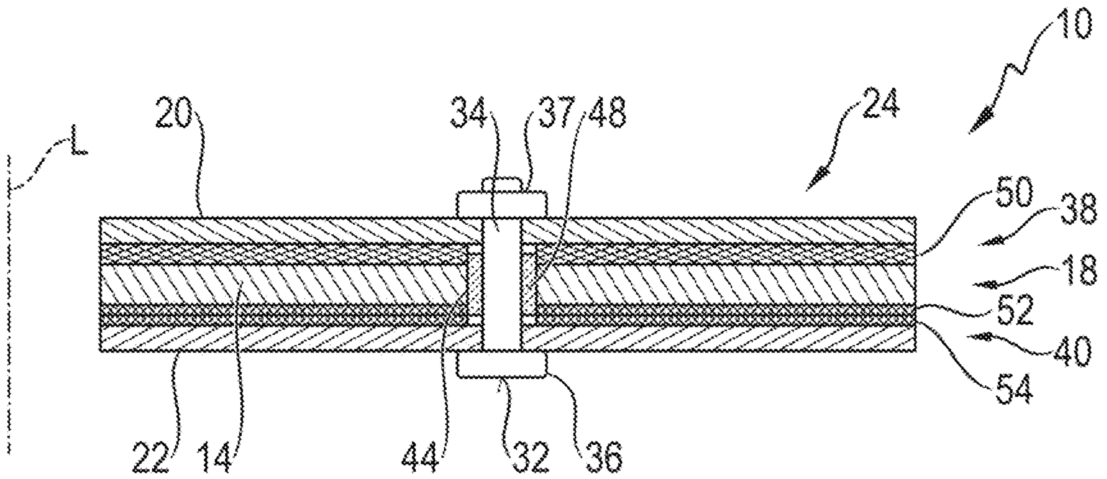
FIG. 3 shows a view of a detail of an exhaust gas heater with a heating conductor of a heating-conductor arrangement arranged between two carrier elements of a carrier arrangement and supported with respect to them by way of insulating coatings; and, FIG. 4 shows a view corresponding to FIG. 3 of an alternative type of configuration.
Figure 4:
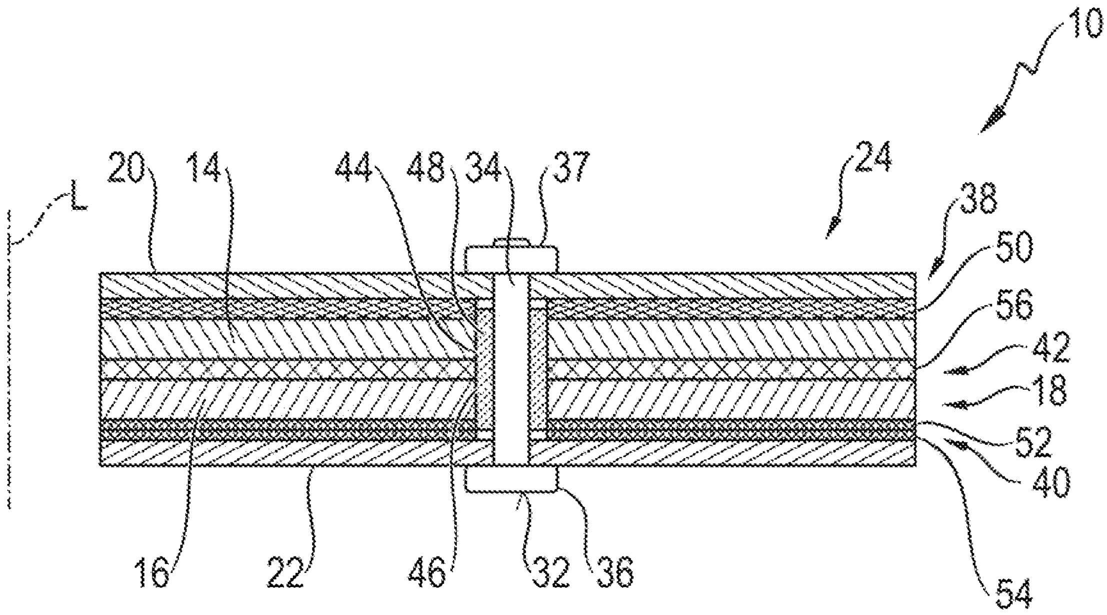

There follows a detailed description with reference to FIGS. 3 and 4 of how, according to the principles of the present disclosure, in an exhaust gas heater 10 with the configuration previously described with regard to its basic structure the heating-conductor arrangement 18 can be supported in an electrically insulated manner in the direction of the longitudinal axis L of the exhaust gas heater by the various supporting units 38, 40, 42 without using supporting units inserted as separate components between various components of the exhaust gas heater.

In the case of the configuration of an exhaust gas heater 10 according to the disclosure shown in the form of a detail in FIG. 3, the heating-conductor arrangement 18 includes a single heating conductor 14 arranged between the two carrier elements 20, 22 of the carrier arrangement 24. This heating conductor is supported in an electrically insulated manner with respect to the two carrier elements 20, 22 by carrier-arrangement supporting units 38, 40 provided in the form of insulating coatings. As explained below, various configurational variants are presented here for the supporting of the heating conductor 14 with respect to the carrier element 20 and the supporting of the heating conductor 14 with respect to the carrier element 22 and could each be exchanged for another or could be realized individually in each of the two supporting regions.

In the example shown in FIG. 3, the carrier-arrangement supporting unit 38 includes an insulating coating 50 applied to the carrier element 20. The insulating coating 50 may substantially cover the entire surface of the carrier element 20 that is facing the heating conductor 14 or may only cover the regions of the carrier element 20 by which the carrier element 20 is supported on the heating conductor 14. The insulating coating 50 is not securely bonded with respect to the heating conductor 14, so that in principle relative movements that are for example thermally induced or caused by vibrations are made possible between the heating conductor 14 and the carrier element 20 or the insulating coating 50 provided thereon. In the case of a modification, the insulating coating 50 could be provided on the side of the heating conductor 14 that is facing the carrier element 20 for example so as to cover it over substantially the entire surface area or only be provided at the regions of the heating conductor 14 that interact in a supporting manner with the carrier element 20.

In the supporting path of the heating conductor 14 to the carrier element 22, the carrier-arrangement supporting unit 40 includes two insulating coatings 52, 54. In this case, the insulating coating 52 has been applied to the side of the heating conductor 14 that is facing the carrier element 22, while the insulating coating 54 has been applied to the side of the carrier element 22 that is facing the heating conductor 14. The insulating coatings 52, 54 may also be provided so as to cover the components respectively carrying them, that is, the heating conductor 14 or the carrier element 22, over substantially the entire surface area, or only be provided at the regions in which the heating conductor 14 and the carrier element 22 are interacting or enter into interaction with one another in a supporting manner.

In order also to achieve insulation with respect to the connecting elements 32 holding the carrier element 24 together with the heating-conductor arrangement 18, they may be surrounded by the sleeve-like insulating element 48, for example of a ceramic material, in the regions of their length that pass through the assigned connecting-element openings 44 in the heating conductor 14. In order to avoid mutual disturbance with the insulating coating or coatings 50, 52 or 54, they may be interrupted where a connecting-element opening 44 is formed in the heating conductor 14, in order to provide space for receiving portions of a respective insulating element 48 that protrude axially beyond the heating conductor 14.

A configurational form in which the heating-conductor arrangement 18 includes two heating conductors 14, 16 following one another in the direction of the longitudinal axis L of the exhaust gas heater is shown in FIG. 4. Also in the case of the configuration of an exhaust gas heater 10 shown in FIG. 4, the first carrier-arrangement supporting unit 38 arranged between the carrier element 20 and the heating conductor 14 may include an insulating coating 50 applied to the carrier element 20 or the heating conductor 14. Alternatively, an insulating coating could have been applied to each element of the carrier element 20 and the heating conductor 14.

In the example shown, the heating conductor 16 is supported on the carrier element 22 in an electrically insulated manner by way of the two insulating coatings 52, 54, with the insulating coating 52 having been applied to the heating conductor 16 and the insulating coating 54 having been applied to the carrier element 22. Alternatively, a single insulating coating could have been applied in this region, for example to the carrier element 22 or the heating conductor 16.

The heating-conductor supporting unit 42 that provides electrical insulation and axial supporting of the two heating conductors 14, 16 with respect to one another includes an insulating coating 56, which may have been applied to the heating conductor 14 or the heating conductor 16. Alternatively, also in this region an insulating coating may have been applied to each of the heating conductors 14, 16, with the two heating conductors 14, 16 then being supported axially against one another in an electrically insulated manner with respect to one another by these two insulating coatings.

The shank 34 of the or each connecting element 32 is surrounded in the region of the length of the same that passes through the connecting-element openings 44, 46 of the heating conductors 14, 16 by the sleeve-like insulating element 48, for example of a ceramic material, and consequently is electrically insulated with respect to the heating conductors 14, 16 in this region of its length.

The insulating coatings 50, 52, 54, 56 may be applied to the respectively assigned components, that is, the carrier elements 20, 22 or the heating conductors 14, 16, by measures that are known in the prior art. For example, they may be applied by vapor deposition. Alternatively, the material of the insulating coatings 50, 52, 54, 56 may be applied in a flowable state to the regions to be coated of the surfaces of the components concerned and then cure thermally and/or chemically. The insulating material may for example be a ceramic material, which on the one hand has a comparatively high mechanical stability, on the other hand provides a very good electrically insulating effect along with high temperature resistance, even when comparatively thin insulating coatings are used.

Since, in the case of an exhaust gas heater constructed according to the disclosure, both the electrical insulation and the axial supporting of various components of the exhaust gas heater are realized by insulating coatings which are in each case only securely bonded to one of the components that are to be supported with respect to one another, to be specific that component to which they have been applied, it is ensured in the case of components supported on one another that there is relative mobility of the same with respect to one another, so that excessive mechanical loading of the supporting units realizing the support and provided by coatings is avoided. Nevertheless, the use of materials with a high-temperature resistance, such as for example ceramic-based inorganic insulating materials, allows mechanically stable electrical insulation to be provided even at high temperatures.

Since the insulating coatings 50, 52, 54, 56 can be applied to substantially any desired surface regions of the components to be coated therewith, it is for example also possible to coat the heating conductor or conductors 14, 16 in the region of the respective connecting-element openings 44, 46, in order in this way also to obtain electrical insulation with respect to the connecting elements 32 passing through these connecting-element openings 44, 46. It is then possible to dispense with the use of the insulating elements 48 that also provide electrical insulation, or to use instead of the insulating elements 48 less-expensive, electrically non-insulating sleeves, the primary function of which is the radial centering of the connecting elements 32 in the respective connecting-element openings 44, 46.

It is understood that the foregoing description is that of the preferred embodiments of the invention and that various changes and modifications may be made thereto without departing from the spirit and scope of the invention as defined in the appended claims.

What is claimed is:

1. An exhaust gas heater for an exhaust gas system of an internal combustion engine, the exhaust gas heater comprising:

a carrier arrangement;

a heating-conductor arrangement carried on said carrier arrangement and having first and second heating conductors through which a current flows;

at least one carrier-arrangement supporting unit for carrying said first heating conductor in an electrically insulated manner with respect to said carrier arrangement;

a heating-conductor supporting unit for carrying said first heating conductor in an electrically insulated manner with respect to said second heating conductor;

said at least one carrier-arrangement supporting unit including at least one of the following:

i) an insulating coating applied to said carrier arrangement; and, ii) an insulating coating applied to said first and second heating conductors supported on said carrier arrangement via said at least one carrier-arrangement supporting unit; and, iii) said heating-conductor supporting unit including an insulating coating applied to one of said first and second heating conductors supported with respect to one another by said heating-conductor supporting unit; and, iv) an insulating coating applied to said second heating conductor supported with respect to one another by said heating-conductor supporting unit.

2. The exhaust gas heater of claim 1, wherein said at least one of said insulating coating has been applied by deposition or applied in a flowable state.

3. The exhaust gas heater of claim 1, wherein said at least one insulating coating is configured from inorganic insulating material.

4. The exhaust gas heater of claim 3, wherein said inorganic insulating material is ceramic material.

5. The exhaust gas heater of claim 1, wherein said exhaust gas heater defines a longitudinal axis (L); said carrier arrangement includes two carrier elements receiving said heating conductor arrangement therebetween in the direction of said longitudinal axis (L); and, said at least one carrier-arrangement supporting unit includes the insulating coating applied to one of said two carrier elements.

6. The exhaust gas heater of claim 1, wherein said at least one carrier-arrangement supporting unit includes the insulating coating applied to at least one of said first and second heating conductors of said heating-conductor arrangement.

7. The exhaust gas heater of claim 1, further comprising:

a plurality of bolt-like connecting elements connecting said heating-conductor arrangement to said carrier arrangement;

each of said first and second heating conductors having at least one connecting-element opening formed therein;

at least one of said plurality of bolt-like connecting elements passing through at least one of said heating conductors of said heating-conductor arrangement in the region of said at least one connecting-element opening;

said at least one of said plurality of bolt-like connecting elements having a length thereof passing through said at least one connecting element opening;

an insulating element corresponding to said at least one of said plurality of bolt-like connecting elements; and, said at least one of said plurality of bolt-like connecting elements being surrounded by said insulating element in the region of said length passing through said at least one connecting-element opening.

8. An exhaust gas heater for an exhaust gas system for an internal combustion engine, the exhaust gas heater comprising:

a carrier arrangement;

a heating conductor arrangement carried on said carrier arrangement and having at least one heating conductor through which current flows;

at least one carrier-arrangement supporting unit for carrying said at least one heating conductor in an electrically insulated manner with respect to said carrier arrangement; and, said at least one carrier-arrangement supporting unit including at least one of the following:

i) an insulating coating applied to said carrier arrangement; and, ii) an insulating coating applied to said at least one heating conductor supported on said carrier arrangement via said carrier-arrangement supporting unit.

9. The exhaust gas heater of claim 8, wherein said at least one of said insulating coating has been applied by deposition or applied in a flowable state.

10. The exhaust gas heater of claim 8, wherein said at least one insulating coating is configured from inorganic insulating material.

11. The exhaust gas heater of claim 10, wherein said inorganic insulating material is ceramic material.

12. The exhaust gas heater of claim 8, wherein said exhaust gas heater defines a longitudinal axis (L); said carrier arrangement includes two carrier elements receiving said heating conductor arrangement therebetween in the direction of said longitudinal axis (L); and, said at least one carrier-arrangement supporting unit includes an insulating coating applied to one of said two carrier elements.

13. The exhaust gas heater of claim 8, wherein said at least one carrier-arrangement supporting unit includes the insulating coating applied to said at least one heating conductor of said heating-conductor arrangement.

14. The exhaust gas heater of claim 8, further comprising:

a plurality of bolt-like connecting elements connecting said heating conductor arrangement to said carrier arrangement;

said at least one heating conductor having at least one connecting-element opening formed therein;

at least one of said plurality of bolt-like connecting elements passing through said at least one heating conductor of said heating-conductor arrangement in the region of said at least one connecting-element opening;

said at least one of said plurality of bolt-like connecting elements having a length thereof passing through said at least one connecting-element opening;

an insulating element corresponding to said at least one of said plurality of bolt-like connecting elements; and, said at least one of said plurality of bolt-like connecting elements being surrounded by said insulating element in the region of said length passing through said at least one connecting-element opening.

15. An exhaust gas system for an internal combustion engine, the exhaust gas system comprising:

an exhaust gas heater including:

a carrier arrangement;

a heating conductor arrangement carried on said carrier arrangement and having at least one heating conductor through which current flows;

at least one carrier-arrangement supporting unit for carrying said at least one heating conductor in an electrically insulated manner with respect to said carrier arrangement; and, said at least one carrier-arrangement supporting unit including at least one of the following:

i) an insulating coating applied to said carrier arrangement; and, ii) an insulating coating applied to said at least one heating conductor supported on said carrier arrangement via said carrier-arrangement supporting unit.

* * * * *